(12) United States Patent
Gafforelli et al.

(10) Patent No.: US 9,027,592 B2
(45) Date of Patent: May 12, 2015

(54) VALVE FOR MOTOR VEHICLE EXHAUST MUFFLER

(75) Inventors: David Gafforelli, Audincourt (FR); Djafar Larbi, La Verriere (FR); Antoine Pascal, Shanghai (CN)

(73) Assignee: Faurecia Systemes d'Echappement, Nanterre (FR)

( * ) Notice: Subject to any disclaimer, the term of this patent is extended or adjusted under 35 U.S.C. 154(b) by 802 days.

(21) Appl. No.: 13/246,068

(22) Filed: Sep. 27, 2011

(65) Prior Publication Data

US 2012/0073277 A1     Mar. 29, 2012

(30) Foreign Application Priority Data

Sep. 29, 2010   (FR) ...................................... 10 57851

(51) Int. Cl.
   *F16K 15/03*   (2006.01)
   *F01N 1/16*    (2006.01)
   *F16K 17/04*   (2006.01)

(52) U.S. Cl.
   CPC ................ *F01N 1/165* (2013.01); *F01N 1/163* (2013.01); *F01N 2290/10* (2013.01); *F01N 2390/08* (2013.01); *F16K 15/031* (2013.01); *F16K 17/0493* (2013.01)

(58) Field of Classification Search
   CPC ..... F01N 1/163; F01N 1/165; F01N 2290/10; F16K 15/031
   USPC .................................... 137/522, 527; 251/337
   See application file for complete search history.

(56) References Cited

U.S. PATENT DOCUMENTS

| | | | | |
|---|---|---|---|---|
| 4,196,745 A | * | 4/1980 | Schutzer | 137/512.1 |
| 5,099,886 A | * | 3/1992 | Squirrell | 137/856 |
| 2007/0246218 A1 | * | 10/2007 | Vick et al. | 166/332.8 |
| 2010/0126159 A1 | | 5/2010 | Han et al. | |

FOREIGN PATENT DOCUMENTS

EP        1408206 A1     4/2004

OTHER PUBLICATIONS

French Search Report dated Apr. 19, 2011.

* cited by examiner

*Primary Examiner* — Kevin Lee
*Assistant Examiner* — P. Macade Nichols
(74) *Attorney, Agent, or Firm* — Carlson, Gaskey & Olds, PC

(57) ABSTRACT

A valve comprises a support including an exhaust gas passage opening, a plug able to move by tilting between a plugging position and a release position of the passage opening, and an elastic strip for returning the plug to its plugging position. The elastic strip has a first end fastened to the support and a second end bearing on the plug. The second end is able to slide on the plug between a first position, in which the plug is in the plugging position, and a second position, in which the plug is in the release position. The plug includes a stop forming a hard spot that cooperates with the second end of the elastic strip when the elastic strip is in the first position, so that this stop forms an obstacle for movement of the second end of the elastic strip from the first position to the second position.

19 Claims, 2 Drawing Sheets

VALVE FOR MOTOR VEHICLE EXHAUST MUFFLER

RELATED APPLICATION

This application claims priority to French Application No. 10 57851, filed Sep. 29, 2010.

TECHNICAL FIELD

The present invention relates to an improved valve, in particular for a motor vehicle exhaust muffler.

BACKGROUND OF THE INVENTION

Already known in the state of the art, in particular according to WO 2008/102093, is a motor vehicle exhaust valve, of the type comprising: a support including an exhaust gas passage opening; a plug that is able to tilt between a plugging position and a position freeing the passage; and an elastic strip for returning the plug to its plugging position. The elastic strip has a first end fastened to the support and a second end bearing on the plug. The second end is able to slide on the plug between a first position, in which the plug is in its plugging position, and a second position, in which the plug is in its release position.

Such a valve is steered by the exhaust gas that circulates in the exhaust line, as a function of the flow rate of said gas. In fact, this gas generates a thrust force on the plug, opposite a return force generated by the elastic return strip. When the flow rate of the gas is high enough, the thrust force is greater than the return force, with the result that the plug goes into its release position to allow the passage of the gas through the passage opening.

Said valve has both an acoustic, noise reduction function and a permeability function. Thus, for optimal effectiveness, the valve should remain closed when the exhaust gas flow rate is low to ensure a relatively low noise level, and the valve should open quickly and significantly when the gas flow rate is greater to facilitate the passage of the exhaust gas, and so as not to hinder the proper operation of the engine.

In general, a valve of the state of the art does not make it possible to perform these two functions perfectly. For example, if the stiffness of the elastic strip is too high, therefore generating a high return force, the valve remains in its plugging position at a low gas flow rate, but does not open with a large enough angle at a high flow rate. However, if the stiffness of the elastic strip is too low, therefore generating a low return force, the valve opens correctly at a high flow rate, but generally also opens for a low gas flow rate for which it should remain in the plugged position.

SUMMARY OF THE INVENTION

An exhaust valve is provided that can optimally perform both a noise reduction function and a permeability function.

An exhaust valve, in particular for a motor vehicle, is of the type that comprises: a support comprising an exhaust gas passage opening; a plug able to move by tilting between a plugging position and a release position of the passage; and an elastic strip for returning the plug to the plugging position. The elastic strip has a first end fastened to the support and a second end bearing on the plug. The second end is able to slide on the plug between a first position, in which the plug is in the plugging position, and a second position, in which the plug is in the release position. The plug includes a stop forming a hard spot, which cooperates with the second end of the elastic strip when said elastic strip is in the first position, so that this stop forms an obstacle for the movement of the second end of the elastic strip from the first position to the second position.

Owing to the stop forming the hard spot, the valve remains plugged in case of a low exhaust gas flow rate. In fact, the thrust force generated by the exhaust gas must be above a predetermined value, depending in particular on the stop, to allow the elastic strip to exceed said stop and thereby allow the plug to be opened.

Furthermore, in case of a high exhaust gas flow rate, the thrust force generated by this gas exceeds said predetermined value, with the result that the elastic strip exceeds the stop forming the hard spot. In that case, only the return force generated by the elastic strip then opposes the force generated by the exhaust gases, with the result that, by choosing an elastic strip with a relatively low stiffness, said elastic strip does not oppose the proper opening of the plug.

Thus, the valve remains correctly closed at the low gas flow rate, and opens enough at the high gas flow rate.

The valve can also include one or more of the following features, considered alone or according to all technically possible combinations:
- the elastic strip includes, between its first and second ends, a line of curvature around which the elastic strip can bend, and the support has, near said line of curvature, a support stop for the elastic strip, opposing the bending of said elastic strip;
- the plug includes a blind cavity, including a back wall with which the second end of the elastic strip cooperates when said elastic strip is in its second position;
- the support includes a stop for limiting the tilting of the plug, delimiting the release position of said plug;
- the support includes a first planar part, comprising the passage opening, and a second planar part, secured to the first part and forming an obtuse angle with said first part, the second part supporting the first end of the elastic strip;
- the valve includes a hinge to guide the tilting of the plug, the hinge including a first tab secured to the plug, folded substantially circularly, and surrounded by a second tab secured to the support, and also folded substantially circularly;
- the second tab supports the bearing stop of the elastic strip;
- the second tab supports the stop limiting the tilting of the plug, the limiting stop preferably being formed by one end of the second tab;
- the support includes a first planar part, comprising the passage opening, and a second planar part, secured to the first part and forming an acute angle with said first part, the second part supporting the first end of the elastic strip;
- the second part includes a section folded toward the plug, supporting the elastic strip, and the end of which forms the stop limiting the tilting of the plug.

BRIEF DESCRIPTION OF THE DRAWINGS

The invention will be understood upon reading the following description, provided only as an example, and done in reference to the appended Figures, in which.

DETAILED DESCRIPTION

Figure 1:
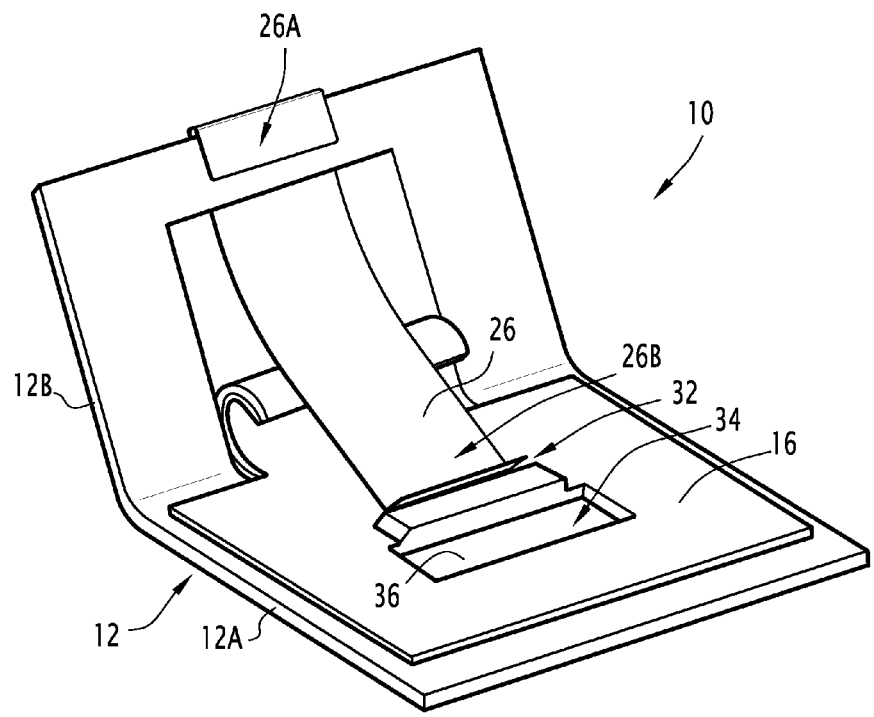
FIG. 1 is a perspective view of a valve according to a first embodiment of the invention.
Figure 2:
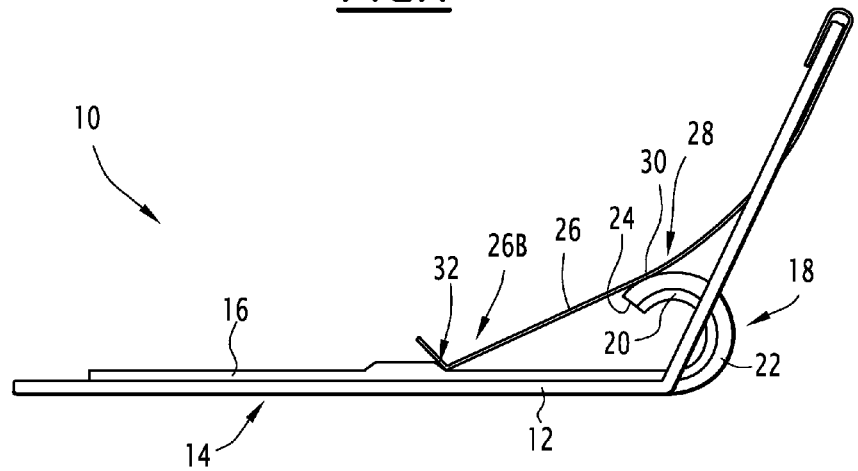
FIG. 2 is a profile view of the valve of FIG. 1.

FIGS. 1 and 2 show a valve 10 according to a first embodiment of the invention, intended to equip a motor vehicle exhaust line.

The valve 10 includes a support 12, comprising an exhaust gas passage opening 14.

According to this first embodiment, the support 12 includes a first planar part 12A, in which the passage opening 14 is formed, and a second planar part 12B, secured to the first part, and forming an obtuse angle with said first part 12A. For example, the support is formed by a sheet folded to form the first 12A and second 12B parts.

The valve 10 also includes a plug 16, which can move by tilting between a plugging position of the passage 14, as shown in FIGS. 1 and 2, and a release position of said passage 14 (not shown).

In order to guide the tilting of the plug 16 relative to the support 12, said plug 16 is connected to said support 12 via a hinge 18. For example, the hinge 18 has a first tab 20, which is secured to the plug 16 and is folded substantially circularly. The first tab 20 is surrounded by a second tab 22, which is secured to the support 12 and is also folded substantially circularly.

For example, the second tab 22 extends the first part 12A of the support while being formed by cutting out in the second part 12B of the support.

Advantageously, the end of the second tab 22 forms a stop 24 for limiting the tilting of the plug 16, delimiting the release position. Alternatively, such a limiting stop could be formed using other traditional methods.

The valve 10 also includes an elastic strip 26 for returning the plug 16 to its plugging position.

The elastic strip 26 can be made from different types of materials. For example, the elastic strip 26 can be made from a metal material or a composite material.

In the case of a metal material, the elastic strip 26 can be made from all types of metals or alloys that may be intended for high-temperature applications, such as: iron-, nickel, cobalt molybdenum-, tantalum-, niobium, or tungsten-based alloys, inter-metallic alloys, or oxide dispersion strengthened (O.D.S.) alloys.

In the case of a composite material, the elastic strip 26 can be made from any type of composite material with an organic, metal, or ceramic matrix.

The material will be chosen as a function of the target temperature for said application, for a maximum of 1200° C.

The elastic strip 26 includes a first end 26A fastened to the support 12, for example to the second part 12B of the support 12. The elastic strip 26 also has a second end 26B bearing on the plug 16.

This second end 26B can slide on the plug 16 between a first position, as shown in FIGS. 1 and 2, in which the plug 16 is in its plugging position, and a second position (not shown), in which the plug 16 is in its release position.

Preferably, the elastic strip 26 has a first line of curvature 28 between its first 26A and second 26B ends, around which the strip 26 can bend. Advantageously, the support 12 has, near said line of curvature 28, a bearing stop 30 of the elastic strip 26, opposing the bending of the elastic strip 26. Preferably, the bearing stop 30 is supported by the second tab 22 of the hinge 18.

In order to keep the plug 16 in position when the exhaust gas flow rate is low, said plug 16 has a stop 32 forming a hard spot, cooperating with the second end 26B of the elastic strip 26 when said elastic strip 26 is in its first position, as shown in FIGS. 1 and 2.

The stop 32 forming the hard spot is made by drawing the plug 16. Alternatively, said stop 32 could be attached on the plug 16.

The stop 32 forming the hard spot defines a predetermined resistance force, which depends on the incline of said stop 32 relative to the plug 16. When the thrust force generated by the exhaust gas is less than said predetermined resistance force, said thrust force is not sufficient to allow the second end 26B of the elastic strip 26 to exceed the stop 32 from the first position to the second position of the elastic strip 26.

It will be noted that, due to the bearing stop 30 of the elastic strip 26, which opposes the bending of the elastic strip 26, the thrust force generated by the exhaust gas does not cause the elastic strip 26 to bend, but rather only the thrust of said elastic strip 26 relative to the stop 32.

After the stop 32 forming the hard spot is exceeded by the elastic strip 26, only the elastic return force generated by said elastic strip 26 opposes the opening of the plug 16. Thus, the plug 16 quickly and easily goes to its release position, or at least opens enough for an optimal passage of the exhaust gases through the opening 14.

Advantageously, the plug 16 includes a blind cavity 34 in which the second end 26B of the strip 26 can go after having topped the stop 32. Said blind cavity 34 includes a back wall 36, with which the second end 26B of the strip 26 is intended to cooperate when said strip 26 is in its second position. Thus, this blind cavity 34 makes it possible to increase the travel of the plug 16, equivalent to the depth of the cavity 34, relative to the travel of a plug not having such a cavity.

Figure 3:
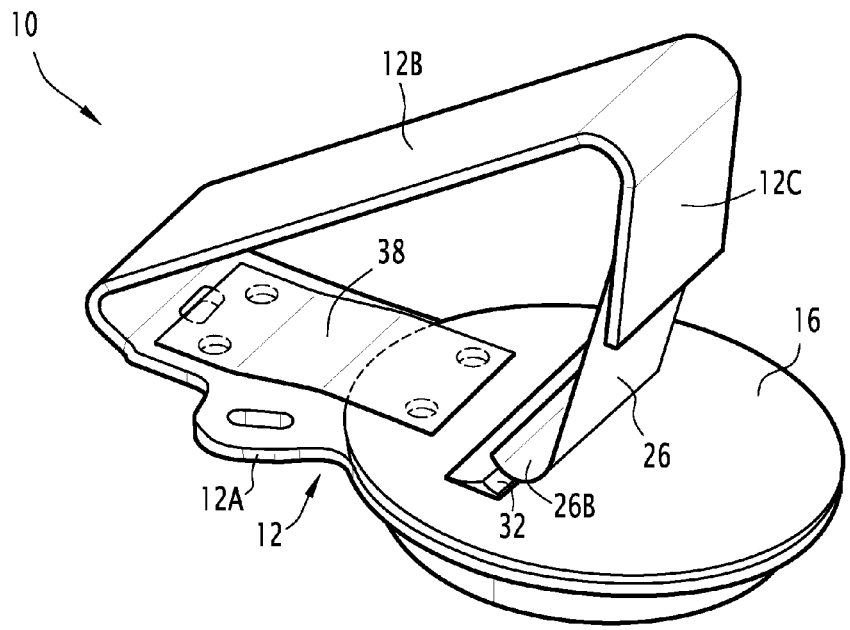
FIG. 3 is a perspective view of a valve according to a second embodiment of the invention.
Figure 4:
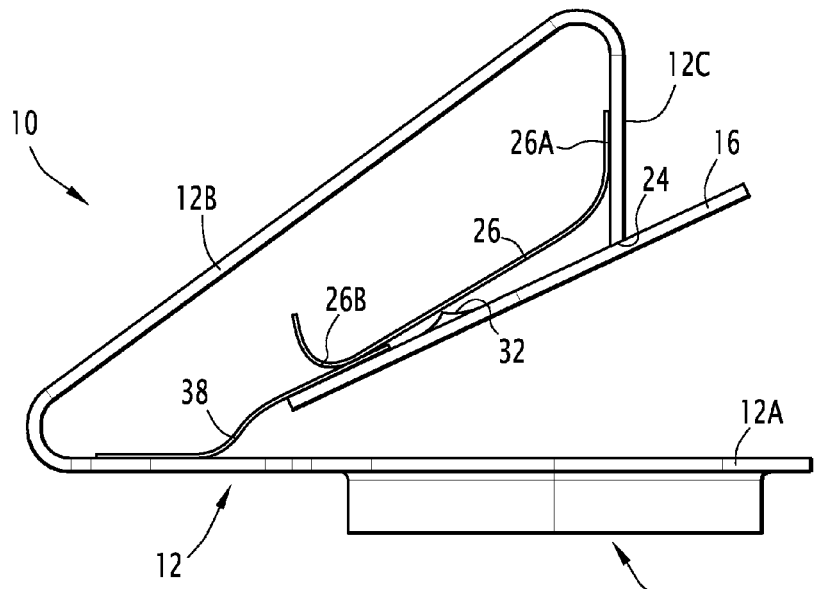
FIG. 4 is a profile view of the valve of FIG. 3, in which the plug is in the release position of the exhaust gas passage.

FIGS. 3 and 4 show a valve 10 according to a second embodiment of the invention. In these Figures, the elements similar to those of the preceding Figures are designated using the same references.

According to this second embodiment, the support 12 has a first planar part 12A, comprising the passage opening 14, and a second planar part 12B, secured to the first part and forming an acute angle with said first part 12A. Thus, the second part 12B extends opposite the first part 12A.

For example, the support 12 is formed by a sheet folded to form the first 12A and second 12B parts.

The second part 12B includes an end section 12C folded toward the plug 16, which supports the first end 26A of the elastic strip 26. Furthermore, the end of said section 12C forms a stop 24 for limiting the tilting of the plug 16, and is intended to cooperate with said plug 16 in the release position, as shown in FIG. 4.

According to this embodiment, the articulation of the plug 16 is done using an elastic tab 38 secured on the one hand to the support 12 and on the other hand to the plug 16.

Furthermore, the stop 32 forming the hard spot is attached on the plug 16 in a traditional way, for example by adhesion or welding.

In FIG. 3, the plug 16 is in its plugging position, and the elastic strip 26 is in its first position. The second end 26B of the elastic strip 26 cooperates with the stop 32 to prevent the plug 16 from opening when the force generated by the exhaust gas is below the predetermined stress defined by the stop 32.

In FIG. 4, the plug 16 is in its release position of the passage 14, with the strip 26 having exceeded the stop 32 forming the hard spot, after the thrust force generated by the exhaust gas has exceeded the predetermined force.

It will be noted that the invention is not limited to the embodiment previously described, but on the contrary could assume various alternatives without going beyond the scope of the claims.

In particular, other forms could be provided for the support 12 or for the articulation of the plug 16.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An exhaust valve, in particular for a motor vehicle, comprising:
    a support comprising an exhaust gas passage opening;
    a plug able to move by tilting between a plugging position and a release position of the exhaust gas passage opening;
    an elastic strip for returning the plug to the plugging position, the elastic strip comprising a first end fastened to the support and a second end bearing on the plug, the second end being able to slide on the plug in an axial direction between a first position, in which the plug is in the plugging position, and a second position, in which the plug is in the release position;
    wherein the plug includes a stop forming a hard spot that cooperates with the second end of the elastic strip when said elastic strip is in the first position, the stop forming an obstacle for the movement of the second end of the elastic strip from the first position to the second position in the axial direction; and
    wherein the plug includes a first surface that faces the exhaust gas passage opening and a second surface facing opposite the first surface, and wherein the stop comprises a protrusion extending outwardly from the second surface.

2. The valve according to claim 1, wherein the elastic strip includes, between the first and second ends, a line of curvature around which the elastic strip can bend, and wherein the support has, near said line of curvature, a support stop for the elastic strip that opposes the bending of said elastic strip.

3. The valve according to claim 1, wherein the plug includes a blind cavity having a back wall with which the second end of the elastic strip cooperates when said elastic strip is in the second position.

4. The valve according to claim 1, wherein the support includes a stop for limiting the tilting of the plug, delimiting the release position of said plug.

5. The valve according to claim 1, including a blind cavity formed as a depression in the second surface such that the second end of the elastic strip slides over the protrusion and into the blind cavity when moving from the first position to the second position.

6. The valve according to claim 1, wherein the support comprises a single-piece structure with a first planar portion and a second planar portion orientated at an oblique angle relative to the first planar portion, and wherein the first planar portion includes the exhaust gas passage opening and the first end of the elastic strip is attached to the second planar portion.

7. The valve according to claim 6, wherein the plug is connected to the support via a hinge comprising a first tab extending outwardly from one edge of the plug and a second tab formed as part of the support.

8. The valve according to claim 7, wherein the second tab overlaps the first tab such that both the first and second tabs are folded substantially circularly.

9. The valve according to claim 7, wherein the second planar portion includes a cut-out and wherein the second tab extends from the first planar portion and is formed from material cut from the second planar portion.

10. The valve according to claim 9, wherein the first end of the elastic strip extends through the cut-out such that a curvature of the elastic strip rests on a bearing stop formed on a curved surface of the hinge.

11. The valve according to claim 7, wherein an end of the second tab forms a stop to limit tilting of the plug.

12. The valve according to claim 1, wherein the axial direction is defined as a direction extending along a length of the elastic strip from the first end to the second end.

13. An exhaust valve for a motor vehicle, comprising:
    a support comprising an exhaust gas passage opening;
    a plug able to move by tilting between a plugging position and a release position of the exhaust gas passage opening;
    an elastic strip for returning the plug to the plugging position, the elastic strip comprising a first end fastened to the support and a second end bearing on the plug, the second end being able to slide on the plug in an axial direction between a first position, in which the plug is in the plugging position, and a second position, in which the plug is in the release position;
    wherein the plug includes a stop forming a hard spot that cooperates with the second end of the elastic strip when said elastic strip is in the first position, the stop forming an obstacle for the movement of the second end of the elastic strip from the first position to the second position in the axial direction; and
    wherein the support includes a first planar part, comprising the exhaust gas passage opening, and a second planar part, secured to the first part and forming an obtuse angle with said first part, the second part supporting the first end of the elastic strip.

14. The valve according to claim 13, including a hinge to guide the tilting of the plug, the hinge including a first tab secured to the plug and folded substantially circularly, and where the first tab is covered by a second tab secured to the support, and which is also folded substantially circularly.

15. The valve according to claim 14, wherein the second tab supports a support stop for the elastic strip that opposes the bending of said elastic strip.

16. The valve according to claim 14, wherein the second tab supports a stop limiting the tilting of the plug, said stop delimiting the release position of said plug.

17. The valve according to claim 16, wherein the limiting stop is formed by one end of the second tab.

18. An exhaust valve for a motor vehicle, comprising:
    a support comprising an exhaust gas passage opening;
    a plug able to move by tilting between a plugging position and a release position of the exhaust gas passage opening;
    an elastic strip for returning the plug to the plugging position, the elastic strip comprising a first end fastened to the support and a second end bearing on the plug, the second end being able to slide on the plug in an axial direction between a first position, in which the plug is in the plugging position, and a second position, in which the plug is in the release position;
    wherein the plug includes a stop forming a hard spot that cooperates with the second end of the elastic strip when said elastic strip is in the first position, the stop forming an obstacle for the movement of the second end of the elastic strip from the first position to the second position in the axial direction; and wherein the support includes a first planar part, comprising the exhaust gas passage opening, and a second planar part, secured to the first part and forming an acute angle with said first part, the second part supporting the first end of the elastic strip.

19. The valve according to claim 18, wherein the second part includes a section folded toward the plug and which supports the elastic strip, and the end of which forms a stop limiting the tilting of the plug.

\* \* \* \* \*

UNITED STATES PATENT AND TRADEMARK OFFICE
CERTIFICATE OF CORRECTION

PATENT NO.        : 9,027,592 B2
APPLICATION NO.   : 13/246068
DATED             : May 12, 2015
INVENTOR(S)       : David Gafforelli Page 1 of 1

It is certified that error appears in the above-identified patent and that said Letters Patent is hereby corrected as shown below:

IN THE CLAIMS:

In claim 1, column 5, line 14; delete ", in particular"

Signed and Sealed this
Twenty-fourth Day of November, 2015

Michelle K. Lee
*Director of the United States Patent and Trademark Office*